United States Patent Office 3,790,516
Patented Feb. 5, 1974

3,790,516
POURABLE, STORABLE, POLYMERIZABLE LACTAM-CATALYST-ACTIVATOR COMPOSITION
Heinz Jorg Rosenbaum, Hans Rudolph, Rolf Dhein, and Klaus Reinking, Krefeld, Germany, assignors to Bayer Aktiengesellschaft, Leverkusen, Germany
No Drawing. Filed Mar. 8, 1972, Ser. No. 232,903
Claims priority, application Germany, Aug. 21, 1971, P 21 41 985.2
Int. Cl. C08g 20/18
U.S. Cl. 260—18 N        9 Claims

ABSTRACT OF THE DISCLOSURE

A pourable, polymerizable lactam-catalyst-activator mixture which is stable on storage comprising at least one lactam having more than 5 ring members, at least one activator and a member of the group consisting of an alkaline catalyst and an 8 to 90% by weight solution of an alkaline catalyst in a lactam having more than 5 ring members said catalyst or solution of the catalyst and optionally said activator being embedded in an organic material.

---

This invention relates to pourable, stable polymerizable lactam-catalyst-activator mixtures which contain one or more catalysts embedded in a hydrophobic organic material.

It is known that lactams such as ε-caprolactam, caprylolactam or lauric lactam can be polymerized to form polyamides by activated anionic polymerization in the presence of a catalyst and an activator.

Catalysts for the activated polymerization of lactams are alkali metal and alkaline earth metal compounds of lactams, e.g. sodium ε-caprolactamate, or of aliphatic carboxylic acids having 1 to 6 carbon atoms, e.g. sodium formate or potassium formate, or of alcohols having up to 6 carbon atoms, e.g. sodium methoxide, potassium tertiary butoxide or sodium phenoxide, or alkali metal and alkali metal and alkaline earth metal hydrides, hydroxides and carbonates.

The activators used are, e.g. isocyanates such as hexamethylene-1,6-diisocyanate, phenyl isocyanate or masked isocyanates such as hexamethylene-1,6-bis(carbamidocaprolactam), ketones, carbodiimides, acid chlorides, carboxylic acid esters, carboxylic acid imides, triazines.

Mixtures of such lactams, catalysts and activators commonly used for activated anionic lactam polymerization are not stable on storage even if kept at room temperature with the exclusion of air and moisture. After a relatively short time they are incapable of being polymerized. It is very important to find a mixture which is stable on storage for simplifying the mixing of the components, transport, keeping reserve stocks and working up.

Lactam-catalyst-activator mixtures which are stable on storage at temperatures below 50° C. have been described in German Offenlegungsschrift No. 1,570,403. They are prepared by using so-called "latent catalysts" which decompose into the reactive catalyst itself only at elevated temperatures of about 140° C. or more with the evolution of $CO_2$. These mixtures have the disadvantage that the polyamide produced contains bubbles caused by the evolution of $CO_2$.

So-called "one component catalysts," i.e. compounds which act both as activators and as catalysts have also been described as forming polymerizable storable mixtures with lactams. These compounds are alkali metal compounds of amides and anilides, e.g. of N,N'-dimethyl-urea, urethanes, acylated hydroxamic acids or caprolactam-N-carboxylic acid anilides (French patent specification No. 1,553,382) or alkali metal salts of α-substituted β-ketoamides (German Offenlegungsschrift No. 1,595,454 and French patent specification No. 1,544,070). These compounds have two disadvantages: firstly they are expensive to produce and secondly they show little activator reactivity which necessitates long operating cycles for static casting, spray casting and rotary casting.

Furthermore, lactam-catalyst mixtures, i.e. two component mixtures, in which the catalyst is contained in lactam tablets have been described in British patent specification No. 928,313 and No. 928,314. Apart from the complications of producing these mixtures, they are not sufficiently pourable and have a high tendency to separate into their components.

It has surprisingly been found that a pourable polymerizable lactam-catalyst-activator mixture which is stable on storage can be obtained by embedding the catalyst and optionally also the activator in a hydrophobic organic material.

This invention therefore relates to a pourable polymerizable lactam-catalyst-activator mixture which is stable on storage, comprising at least one lactam having more than 5 ring members, at least one activator and a member of the group consisting of an alkaline catalyst and an 8 to 90% by weight solution of an alkaline catalyst having more than 5 ring members in a lactam, said catalyst or solution of the catalyst and optionally said activator being embedded in an organic material which is solid at room temperature and contains at least one hydrophobic radical and which loses its barrier effect under the conditions of anionic polymerization by melting or dissolving in the lactam melt.

The lactam-catalyst-activator mixtures preferably contain the catalyst or a catalysts' mixture and optionally also the activator or an activators' mixture embedded in a protective material which is solid below 50° C. In principle, the embedded catalyst in the mixture may be any catalyst suitable for the activated anionic polymerization of lactams, e.g. alkali metal and alkaline earth metal compounds of lactams such as sodium ε-caprolactamate or of aliphatic carboxylic acids having 1 to 6 carbon atoms such as sodium formate or potassium formate or of alcohols having up to 6 carbon atoms such as sodium methylate, potassium tertiary butylate or sodium phenolate or alkali metal and alkaline earth metal hydrides, hydroxides, carbonates.

Substances suitable for use as embedding materials are wax-like compounds which have a melting point above 50° C. and which lose their barrier effect at the polymerization temperature, i.e. between 100 and 250° C. by melting or dissolving in the lactam melt. The wax-like compounds contain in the molecule at least one hydrophobic radical which preferably has at least 10 carbon atoms. Such hydrophobic radicals are e.g. linear or branched paraffin chains, optionally interrupted or substituted by aromatic or alicyclic groups or aliphatic condensed ring systems. In principle, there is no upper limit to the number of carbon atoms in the molecule since oligomeric and polymeric compounds are also suitable provided they can be worked up by an embedding or encapsulating process and fulfill the condition mentioned above.

The following are given as examples of such embedding materials: aliphatic hydrocarbons such as paraffins, e.g. hard paraffins, polyolefins, e.g. low molecular weight (high density) and high molecular weight (low density) polyethylenes and polystyrenes, fatty alcohols, having 10 to 30 carbon atoms, e.g. stearyl alcohol, esters of fatty acids, having 10 to 30 carbon atoms, such as stearic acid p-nonyl-phenolate and cholanic acid butyl ester but also waxes and fats of natural or synthetic origin such as beeswax or beef tallow, amides and imides of fatty acids having 10 to 30 carbon atoms, e.g. N-stearyl phthalimide, behenic acid cyclohexylamide, stearic acid cyclohexyl amide or acetic acid stearylamide; ketones having 10 to 30 carbon atoms such as stearone or civetone. Compounds which have other functions in addition to their function as protective material are particularly suitable for example long chained fatty alcohols and amides which function also as molecular weight regulating agents in the polymerization of lactams. Many compounds of the mentioned above also act as mould parting agents. Stearic acid cyclohexylamide is especially suitable. Mixtures of the above mentioned embedding materials may also be used.

Embedding can be effected e.g. by spray drying, fluidized bed coating, electrostatic atomization, coacervation, precipitation of polymers from their solutions and phase-interface (in situ) polymerization.

Effective embedding may also be achieved by mixing the catalyst or an 8 to 9% by weight solution of the catalyst in a lactam having more than 5 ring members with the embedding compound melting the mixture and cooling the melt by any suitable method, leaving it to solidify and then size-reducing it, e.g. by scaling it over a cooling roller. The pourable, stable, polymerizable mixture is obtained by adding the lactam and activator.

The process of embedding may be further simplified by adding the embedding substance or substances already at the stage of preparing the catalyst, e.g. to the lactam melt and sodium methylate.

The particle size of the catalyst is unessential. The embedding substance may be used in quantities of 1 to 500 and preferably 10 to 200% by weight, based on the material which is to be embedded.

The embedded catalysts are added in such quantities that the quantity of catalyst is 0.1 to 20 and preferably 1 to 10 mols percent based on the quantity of lactam which is to be polymerized.

Lactams which have more than 5 ring members, e.g. $\beta$-pyrrolidone, $\epsilon$-caprolactam or lauric lactam are suitable for preparing the stable pourable mixtures according to the invention.

Activators which are suitable for activated anionic polymerization are isocyanates such as phenyl isocyanate, tolylene-1,4-diisocyanate, hexamethylene-1,6-diisocyanate, masked isocyanates such as caprolactam-N-carboxylic acid-N'-phenylamide, carbodiimides such as hexamethylene-1,6-bis-(carbamidocaprolactam), triazines such as triphenoxy-s-triazine, N-acyllactams such as N-stearoyl-caprolactam. If desired, they may also be added to the mixture in an embedded form.

The activator is mixed with the other mixture's components in amounts of from 0.1 to 20 mol percent preferably from 1 to 10 mol percent, based on the quantity of polymerizable lactam.

The overall mixture is normally prepared by mixing the three components, i.e. lactam, embedded catalyst and activator which may also be embedded, at temperatures below 50° C. with the exclusion of moisture. Alternatively, the activator may be dissolyed in the molten lactam and the melt may be cooled, e.g. by means of a cooling roller, and flasked off the roller before the embedded catalyst according to the invention is added.

If desired, additives may be added to these mixtures before, during or after polymerization. These additives may be e.g. regulators such as butyl acetamide, inorganic or organic pigments or dyes such as lamp black, $TiO_2$ or phthalocyanines, plasticizers or mould parting agents, inorganic or organic fibres such as glass fibres or glass fibre mats or fibrous asbestos or fillers such as glass balls, calcium carbonate or bentonite, flameproofing agents such as red phosphorus or organic halogen compounds, phosphoric acid esters or metal oxides, or blowing agents such as azides or hydrocarbons and lastly, polymers may also be added, e.g. ground up polycaprolactam waste, nylon 66 or polystyrene.

The mixtures according to the invention are stored in a sealed container with the exclusion of moisture. Surprisingly, they are stable for weeks not only in nitrogen but also in air. They can be polymerized with undiminished activity even after 6 weeks. It must be regarded as extremely surprising that the polymerization activity of the mixtures according to the invention is in no way deleteriously affected by the embedding material nor even by being stored in air, especially in view of the extreme sensitivity of anionically polymerizable systems.

Polymerization of mixtures according to the invention is carried out in the normal way and without difficulty at temperatures of 140 to 300° C. It may be carried out discontinuously, e.g. in a process of gravity casting or rotary casting, but especially also continuously, e.g. in an injection moulding machine, a screw extruder, in a heated pressure tube in which the polymerizable mixture may first be melted in a vessel in front of the extruder and delivered by a gearwheel pump into the heated cylinder of the apparatus.

This invention also relates to a process for the preparation of polyamides by anionic polymerization of lactams which have more than 5 ring members, characterized in that the lactam is polymerized at temperatures of 140 to 300° C. in the presence of a member of the group consisting of a catalyst and an 8 to 90% by weight solution of the catalyst in a lactam having more than 5 ring members embedded in an organic material which contains at least one hydrophobic radical and is solid at room temperature, and an activator.

The polymerization time and the degree of conversion, expressed by the amount of extract contained in the polyamide produced, are indicated as a measure of the stability on storage of the mixture according to the invention.

EXAMPLE 1

10 g. of approximately 70% sodium $\epsilon$-caprolactamate in $\epsilon$-caprolactam are suspended at 55° C. in a solution of behenic acid cyclohexylamide which has been prepared at 70° C. by dissolving 10 g. of behenic acid cyclohexylamide in 100 ml. of distilled ligroin. The suspension is slowly cooled to room tempreature with stirring. On cooling, it solidifies to a cake which is crushed and then freed from solvent in a desiccator, first in a vacuum produced by a water pump and then in a vacuum produced by an oil pump (approximately 1 mm. Hg).

Several 100 ml. flasks with ground glass stoppers are then filled each with 56.5 g. of caprolactam, 0.5 g. of hexamethylene-1,6-bis-(carbamidocaprolactam) and 0.6 g. of the embedded catalyst described above, flushed with nitrogen three times by evacuation and then releasing the vacuum and allowing nitrogen to enter, and finally sealed tightly with a ground glass stopper. After 21, 52 and 108 days, respectively, a flask is fitted to a stirrer apparatus and immersed in an oil bath which is heated to 210° C. and the contents are polymerized. The polymerization time is taken as the time from the moment when the flask is immersed in the oil bath to the moment when the polyamide produced ceases to be stirrable (no-flow-time). Heating is then continued for 30 minutes at 210° C. and the product is then cooled, removed from its contents, sawn and chopped up and extracted with methanol for 12 hours.

| Flask | Storage time, days | Induction time, minutes | Extract content, percent |
|---|---|---|---|
| 1 | 21 | 11 | 9.2 |
| 2 | 52 | 11.9 | |
| 3 | 108 | 11.2 | 9.3 |

EXAMPLE 2

2 kg. of $\epsilon$-caprolactam, 500 g. of 85% sodium $\epsilon$-caprolactamate in caprolactam and 500 g. of hard paraffin having a melting point of 60 to 62° C. are melted under nitrogen and flaked off a cooling roller. The product has a sodium lactamate content of 11.0% (titration with N/10 HCl against phenolphthalein).

Samples were prepared as in Example 1 from a mixture of 50.0 g. of ε-caprolactam, 0.5 g. of hexamethylene-1,6-bis-(carbamidocaprolactam) and 2.44 g. of this 11% catalyst but the flasks are not flushed with nitrogen but only sealed without the residual air being displaced. Polymerization is carried out as described in Example 1.

| Flask | Storage time, days | Polymerization time, minutes | Extract content, percent |
|---|---|---|---|
| 1 | 0 | 4.2 | 7.7 |
| 2 | 18 | 4.1 | |
| 3 | 30 | 4.2 | 8.5 |
| 4 | 42 | 4.5 | |
| 5 | 64 | 4.7 | 8.1 |

EXAMPLE 3

2 kg. of caprolactam, 500 g. of approximately 85% sodium ε-caprolactamate, 650 g. of stearic acid cyclohexylamide and 500 g. of hard paraffin having a melting point of 60 to 62° C. are melted under nitrogen and stirred. The melt is flaked off over a cooling roller within 40 minutes. Titration with N/10 HCl against phenolphthalein indicates a sodium lactamate content of 7.0%.

Samples are prepared as described in Examples 1 and 2 from 50.0 g. of caprolactam, 0.5 g. of hexamethylene-1,6-bis-(carbamidocaprolactam) and 3.86 g. of this 7.0% catalyst in air but the flasks are stored tightly sealed and the contents are polymerized at the end of the period of storage.

| Flask | Storage time, days | Polymerization time, minutes | Extract content, percent |
|---|---|---|---|
| 1 | 0 | 4.7 | 7.4 |
| 2 | 18 | 5.0 | |
| 3 | 30 | 4.9 | 8.3 |
| 4 | 42 | 6.7 | |
| 5 | 64 | 5.5 | 7.8 |

EXAMPLE 4

1150 g. of hexamethylene-1,6-bis-(carbamidocaprolactam) and 1000 g. of stearic acid cyclohexylamide are melted under nitrogen and when thoroughly mixed the mixture is flaked off over a cooling roller. Colorless flakes having a melting point of 75 to 77° C. are obtained.

Samples are prepared as described in Example 1 from a mixture of 50.00 g. of caprolactam, 0.91 g. of the activator described here and 2.44 g. of the embedded catalyst described in Example 2. The samples are stored in air but tightly sealed and polymerized at the end of the storage time.

| Flask | Storage time, days | Polymerization time, minutes | Extract content, percent |
|---|---|---|---|
| 1 | 0 | 4.8 | 5.3 |
| 2 | 18 | 5.4 | |
| 3 | 30 | 5.0 | 9.4 |
| 4 | 42 | 4.8 | |
| 5 | 64 | 4.8 | 8.0 |

EXAMPLE 5

40 g. of potassium caprolactamate are suspended in a melt heated to 100° C. of 160 g. of stearic acid N-cyclohexylamide with vigorous stirring while nitrogen is passed over. The mixture is poured out on sheets and crushed when solidified. The potassium caprolactamate content determined by titration with N/10 HCl against phenolphthalein is found to be 17.1%.

Samples are prepared as described in Examples 1 and 2 from a mixture of 50.0 g. of caprolactam, 0.5 g. of hexamethylene-1,6-bis-(carbamidocaprolactam) and 1.8 g. of this 17.1% catalyst, stored tightly sealed in air and polymerized at the end of the storage time as described in Example 1.

| Flask | Storage time, days | Polymerization time, minutes | Extract content, percent |
|---|---|---|---|
| 1 | 10 | 4.6 | 7.5 |
| 2 | 33 | 5.1 | |
| 3 | 54 | 4.5 | 8.2 |

EXAMPLE 6

A mixture of 675 g. of ε-caprolactam, 173 g. of stearic acid-N-cyclohexylamide, 130 g. of hard paraffin and 300 g. of an 18.6% solution of sodium methylate in methanol is melted under an atmosphere of nitrogen and stirred. As soon as the temperature of the melt reaches 90° C., a vacuum is applied and the methanol is distilled off. At the end, when the vacuum is about 6 mm. Hg and the temperature 100° C., stirring is continued for 2 hours and the vacuum is then released with nitrogen and the cloudy melt flaked off over a cooling roller. The sodium lactamate content determined by titration with N/10 HCl against phenolphthalein is found to be 12.8%.

Samples are prepared as described in Examples 1 and 2 from a mixture of 50.0 g. of caprolactam, 0.45 g. of hexamethylene-1,6-bis-(carbamidocaprolactam) and 1.91 g. of this 12.8% catalyst, the mixtures are tightly sealed under air and then polymerized after the period of storage as described in Example 1.

| Flask | Storage time, days | Polymerization time, minutes | Extract content, percent |
|---|---|---|---|
| 1 | 0 | 3.75 | 7.2 |
| 2 | 13 | 3.35 | |
| 3 | 40 | 3.60 | 8.0 |

EXAMPLE 7 (COMPARISON EXAMPLE)

Samples containing a mixture of 56.5 g. of ε-caprolactam, 0.3 g. of an 85% sodium caprolactamate in caprolactam and 0.5 g. of hexamethylene-1,6-bis-(carbamidocaprolactam) are prepared as in Example 1. They are stored tightly sealed in air. Even after only 6 days' storage the polymerization time being 15.7 minutes is much too long.

We claim:

1. A pourable, polymerizable lactam-catalyst-activator composition comprising at least one lactam having more than 5 ring members, at least one activator in an amount of from 0.1 to 20 mole percent, based on the quantity of said lactam present, and a catalytic amount of a member selected from the group consisting of an alkaline catalyst and an 8 to 90% by weight solution of an alkaline catalyst in a lactam having more than 5 ring members, said catalyst or said solution thereof being embedded within 1 to 500% by weight, based on the weight of said catalyst or said solution thereof, of a wax-like compound having a melting point above 50° C. and containing in the mloecule at least one hydrophobic radical having at least 10 carbon atoms and losing its barrier effect under the conditions of anionic polymerization by melting or dissolving in the lactam melt whereby said embedded catalyst or said embedded solution thereof is isolated from said lactam and said activator prior to polymerization.

2. A mixture as claimed in claim 1, wherein the embedding material is paraffin, polyolefin, fatty alcohol having 10 to 30 carbon atoms, ester, amide or imide of a fatty acid having 10 to 30 carbon atoms, a wax or fat of natural or synthetic origin or a ketone having 10 to 30 carbon atoms.

3. A mixture as claimed in claim 1, wherein the embedding material is hard paraffin, low molecular weight or high molecular weight polyethylene, polystyrene, stearyl alcohol, stearic acid, p-nonyl-phenolate, cholanic acid, butyl ester, beeswax, beef tallow, N-stearyl phthalimide, behenic acid cyclohexylamide, stearic acid cyclohexyl amide, acetic acid stearylamide, stearone or civetone.

4. A mixture as claimed in claim 1, wherein the lactam component is β-pyrrolidone, ε-caprolactam, oenantholactam, caprylolactam, or lauric lactam.

5. A mixture as claimed in claim 1, wherein as activator an isocyanate, masked isocyanate, carbodiimide, triazine or N-acyllactam is used.

6. A mixture as claimed in claim 1, wherein as activator phenyl isocyanate, tolylene-1,4-diisocyanate, hexamethylene-1,6-diisocyanate, caprolactam - N - carmoxylic acid-N′-phenylamide, hexamethylene-1,6-bis-(carbamidocaprolactam), triphenoxy-s-triazine or N-stearoyl-caprolactam, is used.

7. A mixture as claimed in claim 1, wherein as catalyst an alkali metal or alkaline earth metal compound of a lactam of an aliphatic carboxylic acid having 1 to 6 carbon atoms or of an alcohol having up to 6 carbon atoms is used.

8. A mixture as claimed in claim 1, wherein as catalyst sodium ε-caprolactamate, sodium formate, potassium formate, sodium methylate, potassium tert.-butylate or sodium phenolate is used.

9. The pourable, polymerizable lactam-catalyst-activator composition of claim 1 wherein said catalyst and said activator are each embedded in said wax-like compound.

References Cited

UNITED STATES PATENTS

| | | | |
|---|---|---|---|
| 3,470,139 | 9/1969 | Marshall et al. | 260—78 |
| 3,539,662 | 11/1970 | Hill et al. | 260—78 |
| 3,541,041 | 11/1970 | Hermann et al. | 260—78 |
| 3,513,135 | 5/1970 | Hermann et al. | 260—78 |
| 3,454,537 | 7/1969 | Tokiura et al. | 260—857 |
| 3,262,989 | 7/1966 | Brignac | 260—78 |
| 3,498,956 | 3/1970 | Birkner | 260—78 |
| 3,309,343 | 3/1967 | Darnell et al. | 260—78 |
| 3,567,696 | 3/1971 | Sahler | 260—78 |

FOREIGN PATENTS

| | | | |
|---|---|---|---|
| 928,313 | 6/1963 | Great Britain | 260—78 |
| 928,314 | 6/1963 | Great Britain, et al. | 260—78 |

DONALD E. CZAJA, Primary Examiner

E. C. RZUCIDLO, Assistant Examiner

U.S. Cl. X.R.

260—28, 31.2 N, 32.4 R, 32.6 N, 32.8 N, 33.4 R, 33.6 R, 78 L, 857 UN; 264—300